United States Patent
Brondijk

(10) Patent No.: US 7,693,013 B2
(45) Date of Patent: Apr. 6, 2010

(54) OPTICAL DISC FOR STORING BOTH DATA REQUIRING DEFECT MANAGEMENT AND REAL-TIME AV DATA

(75) Inventor: Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 489 days.

(21) Appl. No.: 10/582,579

(22) PCT Filed: Nov. 25, 2004

(86) PCT No.: PCT/IB2004/052550

§ 371 (c)(1), (2), (4) Date: Jun. 12, 2006

(87) PCT Pub. No.: WO2005/062303

PCT Pub. Date: Jul. 7, 2005

(65) Prior Publication Data

US 2007/0136516 A1 Jun. 14, 2007

(30) Foreign Application Priority Data

Dec. 19, 2003 (EP) .................................. 03104819

(51) Int. Cl.
*G11B 7/00* (2006.01)
(52) U.S. Cl. .................. 369/47.14; 369/53.2; 369/53.17
(58) Field of Classification Search ....................... None
See application file for complete search history.

(56) References Cited

U.S. PATENT DOCUMENTS

| 5,263,008 | A  | * | 11/1993 | Fujio et al. | ................. | 369/13.28 |
| 6,327,674 | B1 | * | 12/2001 | Ito et al. | ......................... | 714/8 |
| 6,341,109 | B1 | * | 1/2002 | Kayanuma | ................. | 369/47.14 |
| 6,697,307 | B1 | * | 2/2004 | Ko et al. | ................... | 369/47.14 |
| 7,092,327 | B2 | * | 8/2006 | Lee et al. | ................... | 369/47.14 |
| 2003/0210896 | A1 | * | 11/2003 | Matsuno et al. | ................ | 386/95 |

* cited by examiner

*Primary Examiner*—Wayne R Young
*Assistant Examiner*—Van N Chow

(57) ABSTRACT

An optical disc (1) for storing digital data, comprising a first storage area (10) for storing a first type of digital data and a second storage area (20) for storing a second type of digital data. Each of the first and second areas comprises a user-data area (11, 21). Furthermore, the storage areas (10, 20) are logically independent. The second storage area (20) has a defect management area (22a, 22b) associated with the user-data area (21) of the second storage area (20) for storing defect management data.

11 Claims, 3 Drawing Sheets

OPTICAL DISC FOR STORING BOTH DATA REQUIRING DEFECT MANAGEMENT AND REAL-TIME AV DATA

FIELD OF THE INVENTION

This invention relates in general to the field of optical discs for storing digital data and more particularly to the field of optical discs for storing both digital data requiring support for defect management and digital real-time audio/video data.

BACKGROUND OF THE INVENTION

Optical discs of today may e.g. be a CD-ROM (Compact Disc Read Only Memory) disc, a CD-R (Recordable) disc, or a DVD (Digital Versatile Disc) for storing digital information. The discs may have different storing capacity and data transfer rates for transferring data to or reading data from the disc. Providing audio/video data for real time recording/reading requires a high data transfer rate.

One optical disc supporting real-time recording/reading of audio/video data is the Blu-ray disc. Using a short-wavelength blue-violet laser, the Blu-ray disc successfully minimizes its beam spot size by making the numerical aperture (NA) on a field lens that converges the laser 0.85. In addition, by using a disc structure with a 0.1 mm optical transmittance protection layer, the Blu-ray disc diminishes aberration caused by disc tilt. This also provides a better disc readout and an increased recording density. The tracking pitch of the Blu-ray disc is reduced to 0.32 µm, almost half that of a regular DVD, achieving up to 27 GB high-density recording on a single-sided disc.

Since the Blu-ray disc utilizes global standard MPEG-2 transport stream compression technology, it is highly compatible with digital broadcasting for real-time audio/video recording, and a wide range of contents can be recorded. It is possible for the Blu-ray disc to record digital high-definition broadcasting while maintaining high-quality and other data simultaneously with video data if they are received together.

To read/write digital data on an optical disc by a drag and drop functionality, it is preferred that physical defect management in the drive is provided. Thus, the optical disc has to have a dedicated area of the recordable area wherein defect management data may be provided.

The Blu-ray video real-time requirements, i.e. 36 Mb/s read/write and 800 ms seek, match the maximum read-write speed of the Blu-ray disc and device. However, the requirements are incompatible with defect management. This means that there is currently no room for the extra delay caused by defect management while playing or recording digital real-time Blu-Ray video data.

In the Blu-ray standard a disc is a single partition containing either a continuous area without defect management or an area with defect management. The standard also requires a certain file system: BDFS (Blu-Ray Disc File System). UDF (Universal Disc Format) is a file system for optical discs. BDFS cannot administer as many files as UDF can, which makes BDFS impractical for PC data use, in which tens of thousands of files on a 27 GB disc can be expected. BDFS is an integral part of the Blu-ray disc and is highly capable of storing data with real-time requirement. UDF, on the other hand, may be used on a Blu-Ray disc in the PC environment. UDF may be used with a Blu-ray disc in which defect management is switched on and can hold tens of thousands of files. The Blu-ray disc standard makes it impossible to have defect management switched on and use it for BDFS at the same time because the logical to physical relationship, i.e. the logical zero point, is at a different location of the disc, is different in the two cases. Thus, separate discs have to be provided in order to meet the conflicting requirements of reading/writing both digital data with support for defect management and read/write real-time audio/video data according to the Blu-ray standard.

SUMMARY OF THE INVENTION

The present invention overcomes the above-identified deficiencies in the art and solves the above problems by providing an optical disc having at least two storage areas, which are logically separate.

Accordingly, according to a first aspect of the invention, there is provided an optical disc, wherein a first storage area is dedicated to storing a first type of digital data, such as audio/video data having a real-time requirement incompatible with defect management. A second storage area is dedicated to storing a second type of digital data, such as data having a requirement for defect management support, e.g. data supporting a drag and drop function. Only the second storage area has associated defect management areas for storing defect management data.

Each of the first and second areas of the disc is accessible separately and independently of the other.

According to a second aspect of the invention, a method for reading digital data from or writing digital data to the optical disc is provided. According to the method, the first storage area is accessed by a first access means when digital data of the first type are to be read from or written to the first storage area. The second storage area is accessed by a second access means when digital data requiring defect management are to be read from or written to the second storage area.

According to a third aspect of the invention, an optical disc drive comprising an optical reader/writer, a drive controller, means for receiving digital data, and means for receiving an optical disc is provided. The drive controller is adapted to access the first storage area of the optical disc in response to receiving instructions to read a first type of data from or write the first type of data to the first storage area. Furthermore, the drive controller is adapted to access the second storage area of the optical disc in response to receiving instructions to read a second type of data from or write the second type of data to the second storage area, the second type of data requiring support for defect management.

According to a fourth aspect of the invention, a computer system comprising a disc drive according to the invention is provided. Separate drive letters within the operating system of the computer may provide separate and independent access to the first and second storage areas of the disc. Alternatively, the first storage area is directly accessible via an application program comprising software-readable instructions to access the first storage area.

It is an advantage of the invention that digital data of separate types can be provided on a high-speed and high-capacity optical disc, such as a Blu-ray disc. Furthermore, it is an advantage that digital data incompatible with defect management and digital data requiring defect management support can be stored on the same disc. With a disc drive capable of accessing the separate storage areas of the disc in a computer system, the data may be read/written independently by means of the computer system. Another advantage of the invention is that, if the storage area dedicated to real-time data is provided as the first storage area of the disc, the disc is compatible with disc recorders known in the art, which do not expect any defect management in the first area.

BRIEF DESCRIPTION OF THE DRAWINGS

Further objects, features and advantages of the invention will appear from the following detailed description of the invention, reference being made to the accompanying drawings, in which.

DETAILED DESCRIPTION OF EMBODIMENTS

Figure 1:
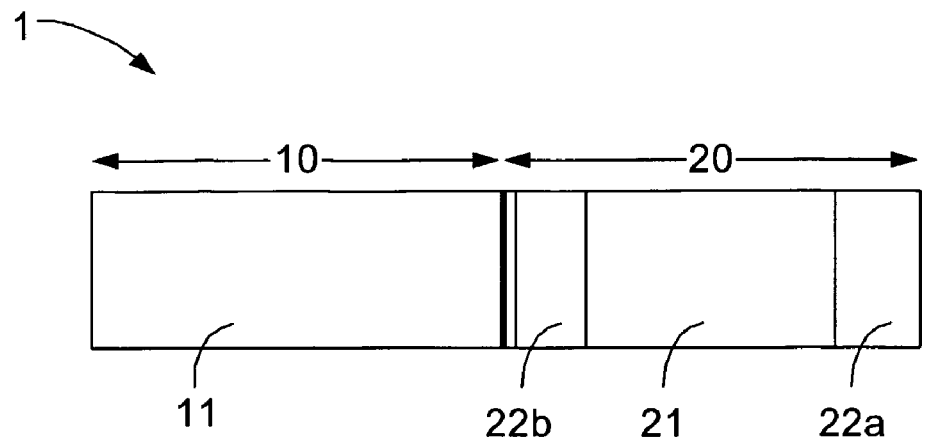
FIG. 1 is a schematic view of a portion of the optical disc according to the invention.
Figure 2:
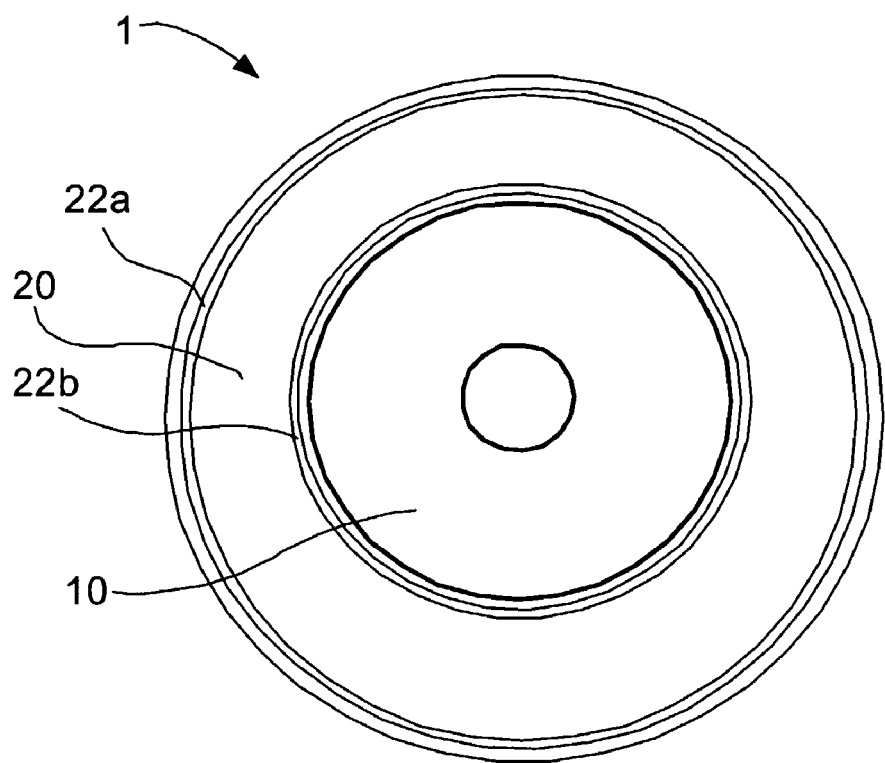
FIG. 2 is a plan view of the optical disc according to the invention.

FIG. 1 illustrates in a first embodiment of the invention in a schematic view of a section of an optical disc 1. A plan view of the disc 1 is illustrated in FIG. 2. The disc 1 has a first storage area 10 for storing digital data relating to a first type of data. A second storage area 20 is provided for storing digital data relating to a second type of digital data.

As shown in FIGS. 1 and 2, the disc 1 comprises two physically separate partitions, comprising two logically independent areas. However, the disc may equally well comprise more than two partitions, as long as at least one area is dedicated to digital data of a first type and at least one area is dedicated to digital data of a second type. The disc 1 has a large storing capacity and a high data transfer rate. Thus, the disc is suitable for storing audio/video data, which may be read from or written to the disc 1 in real time. With the use of a 405-nm blue-violet semiconductor laser, with a 0.85 NA field lens and a 0.1 mm optical transmittance protection disc layer structure, the disc 1 can record up to 27 GB video data on a single-sided 12-cm phase change disc. The data transfer rate of the Blu-ray disc is nominally 36 Mbps. The highest transfer rate is only limited by the disc's highest rotational speed and the lowest transfer rate is zero. Thus read/write of real-time data is supported.

According to the invention, the first type of data is digital data having a real-time constraint, such as 36 Mbs read/write and 800 ms seek, which do not support defect management, e.g. real-time audio/video data. Thus the first type of data may be read/written in real time. The second type of digital data is any type not having any real-time constraint, such as digital data requiring defect management, e.g. data readable/writable by means of a drag and drop function.

According to the invention, the first storage area 10 may be provided as the first, i.e. the innermost, storage area of the disc 1. Thus the disc 10 is useable together with a Blu-ray reader/writer known in the art, as such readers/writers expect to see no defect management. However, the second storage area 20 will not be accessed by the readers/writers known in the art. However, the use of a recorder/writer according to the invention has the advantage that either of the storage areas 10, 20 may be provided as the first storage area of the disc 1.

The first storage area 10 comprises a user-data area 11, which has read/write capabilities for high-speed data without defect management. The data recorded in the first storage area are written/read randomly. A track, or a number of consecutively tracks, may be written randomly, hence not continuously. The real-time constraint specifies the minimum size of these tracks to be 12 MB, the maximum access time to be 800 ms, and the nominal read/write rate 36 Mbps.

The second storage area 20 may support defect management in the disc drive, as is preferred for drag and drop support. When used in a computer, a file may be transferred or copied from e.g. the hard disc drive to the optical disc simply be dragging a link in the operating system to a drive letter referring to the second storage area, or vice versa. To support the defect management, the second storage area 20 comprises at least one user-data area 21 and at least one defect management area 22a. In FIGS. 1 and 2, a second defect management area 22b is also provided, the defect management data being divided between them. However, one large defect management area may be provided instead of two.

If two defect management areas are provided, one is the "main-data area" and the other area is where the replacements of faulty locations in the main-data area are stored. The defect area with replacement locations may either be continuous or fragmented. The "main-data" area may also be continuous or fragmented. Hence, these two areas may also be interleaved, using e.g. Mt Rainier interleaving.

In the user-data area 21 of the second storage area the data are fragmented. Thus, the data may be stored consecutively or randomly in different locations of the user-data area.

The disc 1 is partitioned such that each storage area 10, 20 may be separately and independently accessed. The size of each partition may either be predetermined or determined by the user. Furthermore, the size of each partition may also be changed by the user by studying the BDFS and UDF file system by means of a software tool, such as Partition Magic from Norton Utilities. Such a software tool can re-allocate the partitions if needed and change the border position of the two partitions. The partitions are each addressed logically by the user. Each partition may be viewed as two separate discs, wherein each partition has a logical zero. Alternatively, each partition has its own address space, the first space starting at zero and having a maximum of M−1 addresses 0<=M<=22.27 GB), and the second address space starting at M and continuing to N−1 (N is the size of the disc: 22.27 GB, i.e. 0<=M<=N<=22.27 GB).

Figure 3:
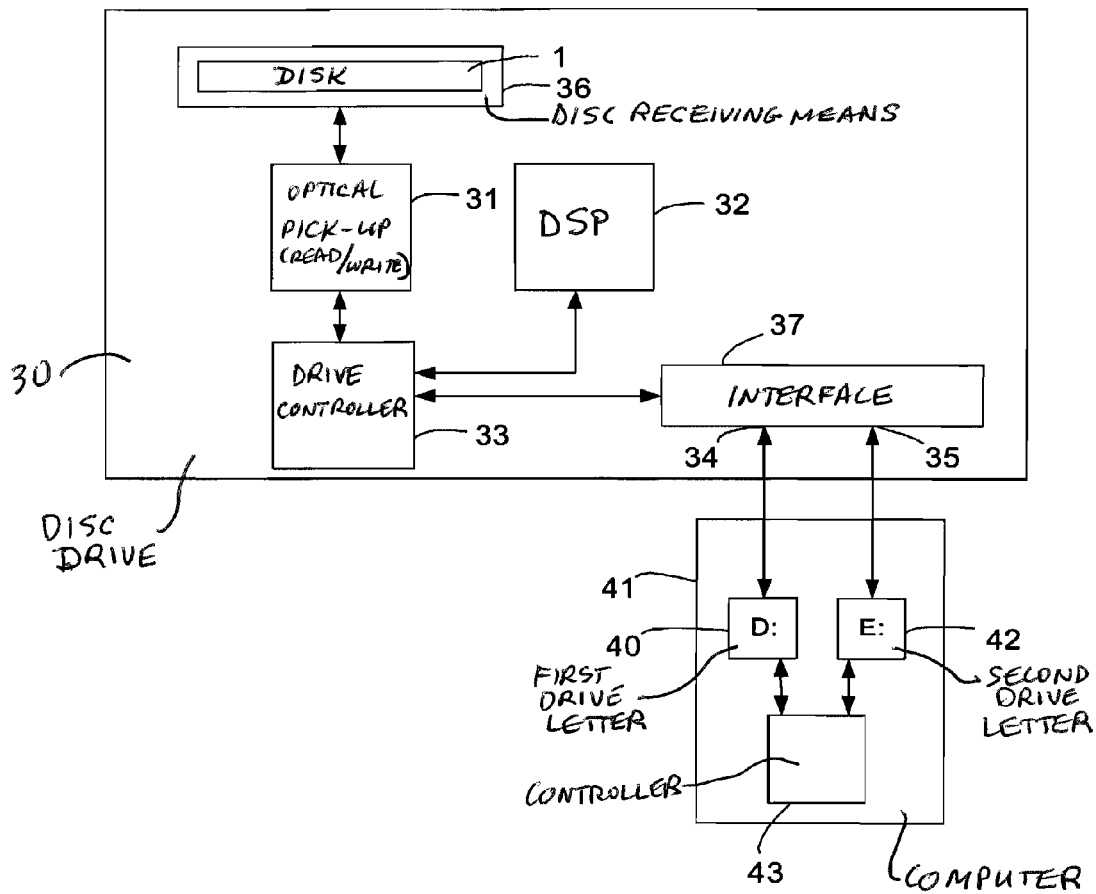
FIG. 3 is a block diagram of a disc drive connected to a computer system.

FIG. 3 is a schematic diagram of a disc drive 30 according to the invention. The disc drive 30 comprises means 36 for receiving a disc 1 when it is inserted into the drive 30. The drive 30 also comprises means for rotating the disc (not shown), such as an electric motor, and means for optically reading/writing the digital data 31, such as an optical pick-up, to transfer data to/from the disc 1. A digital signal processor (DSP) 32 may be provided to process the data received from or transmitted to the read/write means 31.

The DSP 32 may e.g. comprise a controller for controlling the motor, a demodulator, one or several memories, such as a RAM (Random Access Memory) and a ROM (Read Only Memory), a defect management controller for executing defect management, and an interleaver/deinterleaver.

A drive controller 33 is adapted to control the disc drive 30. The drive controller is adapted to detect whether data received through an interface 37 having a first and a second input 34, 35 has a real-time restriction or constraint. This may be detected in that a read/write instruction is received through the first input 34 from a first access means, such as a first drive letter (e.g. D:) 40 of a computer 41, to which the disc drive 30 is connected. When it is detected that a read/write instruction relates to the first type of data, such as an instruction received from the first drive-letter, the read/write means 31 is directed to the first storage area 10. Alternatively, the read/write instruction may relate to the second type of data, e.g. the instruction is received from a second access means, such as a second drive-letter (e.g. E:) 42 of the computer 41. Then, the read/write means is directed to the second storage area 20.

The computer system 41 comprises a controller 43, such as a central processing unit (CPU) to execute computer-readable instructions embodied on the hard disc. The invention is not only usable together with computer systems. It is usable together with any other device having a controller for providing instructions regarding the first and the second type of data to the disc drive 30.

To read/write a digital data file, a user of the computer 41 may simply drag a link to a file from a drive-letter of the computer 41, such as the drive-letter C: commonly used as the drive-letter of the hard-disc drive, and drop the file at the second drive letter 42 indicated by the operating system of the computer. Alternatively, the user may prefer to access a real-time audio/video file of the disc 1. Then the first drive letter 41 is entered, whereupon the drive controller 33 will direct the read/write means 31 towards the first storage area 10. The first storage area may also only be accessible from an application run by the computer. Then, the application program will have computer-readable instructions which will access the first storage area 10 of the disc 1, whereupon the real-time data will automatically be read to/written from the first storage area 10.

Figure 4:
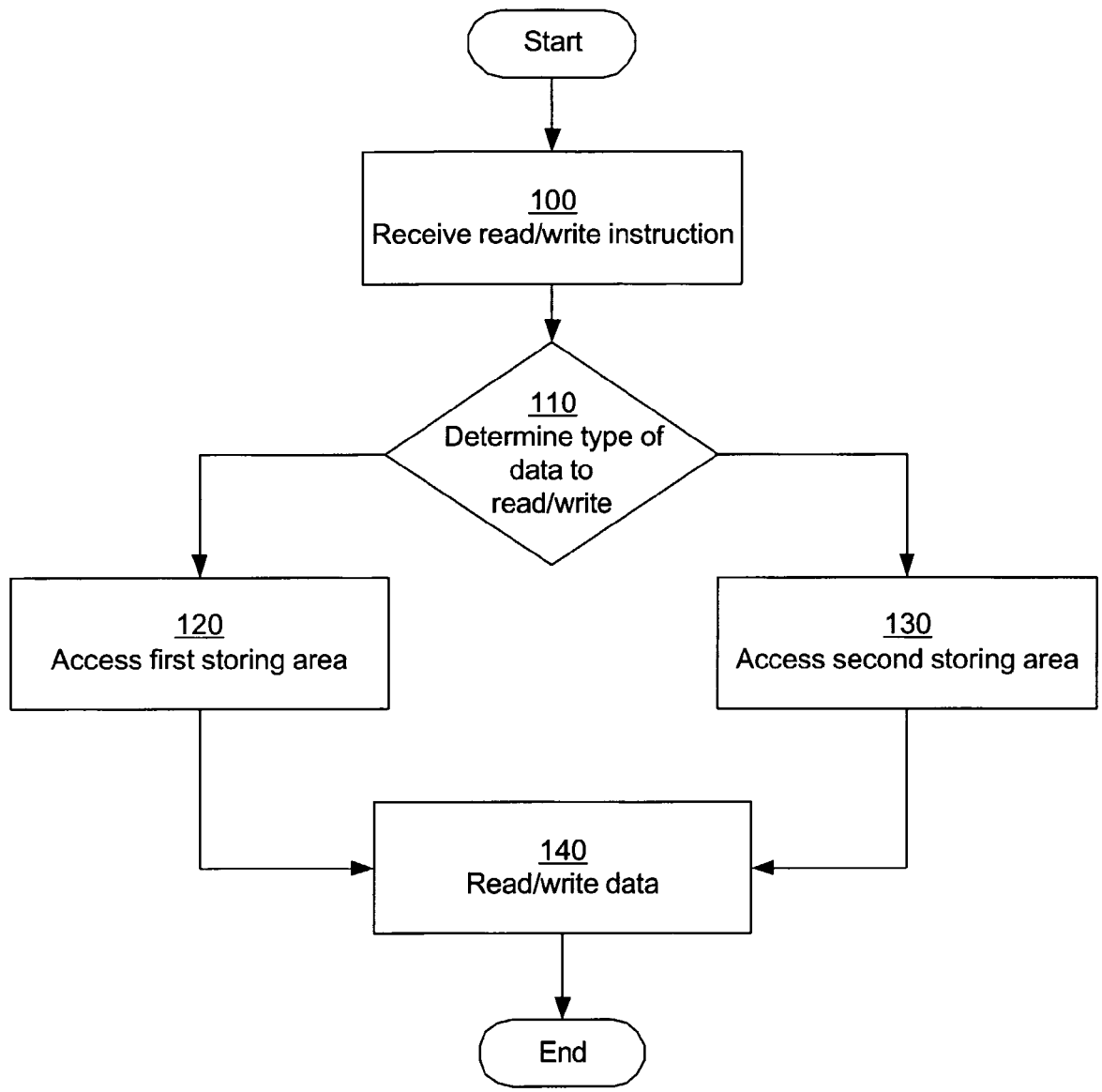
FIG. 4 is a flowchart of a method according to the invention.

FIG. 4 illustrates the steps to be carried out according to the method of the invention for accessing the first or the second storage area 10, 20. In a first step 100, instructions to read data from or write data to the first or the second storage area 10, 20 are received from the computer 41. Then, in step 110 it is determined whether the read/write instruction was executed by the first or the second access means of the computer 41, i.e. which type of data the instruction relates to. If the instruction relates to the first type of data, the procedure continues to step 120 wherein the first storage area 10 is accessed for reading data from or writing data to the disc 1. Alternatively, if the instruction relates to the second type of data, the procedure continues from step 110 to step 130, wherein the second storage area 20 is accessed for reading data requiring support for defect management from or writing such data to the disc 1. Then, in step 140 the digital data in question may be read from or written to the disc 1, whereupon the procedure is ended.

The present invention has been described above with reference to specific embodiments. However, embodiments other than those described above are equally possible within the scope of the appended claims, e.g. performing the above method by hardware or software.

Furthermore, the term "comprising" does not exclude other elements or steps, the terms "a" and "an" do not exclude a plurality and a single processor or other unit may fulfil the functions of several of the units or circuits recited in the claims.

The invention is only limited by the appended patent claims.

The invention claimed is:

1. An optical disc for storing digital data, comprising a first storage area for storing a first type of digital data and a second storage area for storing a second type of digital data, each of the first and second areas comprising a user-data area, wherein the first and the second storage area are logically independent, and wherein said first storage area has reading/writing capabilities for high-speed data without defect management, and said second storage area has reading/writing capabilities for data requiring defect management support and comprises at least one defect management area associated with said user data area of the second storage area for storing defect management data.

2. The optical disc according to claim 1, wherein the first type of data is real-time audio/video data incompatible with defect management, and the second type of data is digital data requiring defect management support.

3. The optical disc according to claim 1, wherein each of the first and second areas has a logical zero, or its own address space.

4. The optical disc according to claim 1, wherein the first and second areas of the disc are independently accessible.

5. The optical disc according to claim 1, wherein the first and second storage areas are fixedly defined.

6. The optical disc according to claim 5, wherein the first and second storage areas can be altered during use.

7. The optical disc according to claim 1, wherein the disc has a nominal data transfer rate of 36 Mbps.

8. A method of reading digital data from or writing digital data to an optical disc comprising a first storage area for storing a first type of digital data and a second storage area, which is logically independent of the first storage area, for storing a second type of digital data requiring support for defect management, each of the first and second areas comprising a user-data area, the method comprising acts of:

accessing the first storage area when digital data of the first type is to be read from or written to the first storage area, accessing the second storage area when digital data of the second type is to be read from or written to the second storage area.

9. An optical disc drive comprising an optical reader/writer, a drive controller, means for receiving digital data, and means for receiving an optical disc, wherein the drive controller comprises:

first access means for accessing a first storage area of an optical disc received in the means for receiving the optical disc in response to receiving instructions to read a first type of data from or write data of the first type to the first storage area; and second access means for accessing a second storage area of the optical disc in response to receiving instructions to read a second type of data from or write data of the second type to the second storage area, the second type of data requiring support for defect management.

10. The disc drive according to claim 9, wherein the disk drive is a portion of a computer system.

11. A computer program product embodied on a computer-readable medium comprising computer-readable instructions to carry out the method according to claim 8 when executed by said computer.

* * * * *